United States Patent [19]
Veldman et al.

[11] Patent Number: 6,059,992
[45] Date of Patent: May 9, 2000

[54] GAS TREATING SOLUTION CORROSION INHIBITOR

[76] Inventors: Ray R. Veldman, 363 N. Sam Houston Pkwy., E. Suite 380, Houston, Tex. 77060; David O. Trahan, P.O. Box 81577, Lafayette, La. 77027

[21] Appl. No.: 08/950,218

[22] Filed: Oct. 14, 1997

Related U.S. Application Data

[63] Continuation-in-part of application No. 08/541,435, Oct. 10, 1995, Pat. No. 5,686,016.

[51] Int. Cl.$^7$ .............................. C01B 3/00; C09K 3/00; C23F 11/00; C23F 11/04
[52] U.S. Cl. ................. 252/188.28; 252/390; 252/393; 252/394; 422/7; 422/12; 422/14; 422/16; 507/939; 507/245; 507/262; 507/264
[58] Field of Search .............................. 252/188.28, 390, 252/393, 394; 507/939, 245, 262, 264; 422/7, 12, 14, 16

[56] References Cited

U.S. PATENT DOCUMENTS

| | | |
|---|---|---|
| 3,779,905 | 12/1973 | Stedman . |
| 3,854,959 | 12/1974 | Costain et al. . |
| 4,399,098 | 8/1983 | Cuisia . |
| 4,487,745 | 12/1984 | Weiss et al. . |
| 4,541,932 | 9/1985 | Muccitelli . |
| 4,626,411 | 12/1986 | Newes et al. . |
| 4,980,128 | 12/1990 | Cuisia et al. . |
| 5,173,213 | 12/1992 | Miller et al. . |
| 5,178,796 | 1/1993 | Gewanter et al. . |
| 5,258,125 | 11/1993 | Kelley et al. . |
| 5,527,447 | 6/1996 | Roof . |
| 5,587,109 | 12/1996 | Greaves et al. . |
| 5,590,716 | 1/1997 | Mansfield ............................... 507/939 |
| 5,654,260 | 8/1997 | Wu ......................................... 507/939 |
| 5,686,016 | 11/1997 | Veldman et al. .................... 252/188.28 |
| 5,766,548 | 6/1998 | Soria ....................................... 252/390 |

FOREIGN PATENT DOCUMENTS 1013041 7/1987 Japan .

*Primary Examiner*—Philip Tucker
*Attorney, Agent, or Firm*—Garvey, Smith, Nehrbass & Doody, L.L.C.

[57] ABSTRACT

Corrosion in aqueous alkanolamine, physical solvents, or combination of alkanolamine and physical solvent solutions used to remove acid gases from natural gas, synthetic gas, or light hydrocarbon streams can be reduced by addition of mixtures of oxygen scavengers or mixtures of oxygen scavengers and sodium molybdate. The oxygen scavengers must be promoted to reduce metal surfaces in contact with the solutions to a more passive, harder, and insoluble form at the operating temperature of the treating system. The sodium molybdate provides additional passivation especially in the imperfections on the surface of the metal where corrosion accelerates.

8 Claims, No Drawings

GAS TREATING SOLUTION CORROSION INHIBITOR

CROSS-REFERENCE TO RELATED APPLICATIONS

This is a continuation-in-part of U.S. patent application Ser. No. 08/541,435, filed Oct. 10, 1995, now U.S. Pat. No. 5,686,016 which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to inhibiting corrosion in gas treating solutions comprised of alkanolamine solutions or other solvents used in the removal of hydrogen sulfide, carbon dioxide, mercaptans or other acid gases from natural gas or other hydrocarbon gases or liquids. Specifically, the present invention relates to passivating the metals in contact with the corrosive solutions by reducing the metal's oxidation state to a lower number. The reduced oxidation state results in a less corrosive, harder, impervious, and insoluble layer in contact with the treating solution. Additionally, the corrosion inhibitor may contain a metal oxide which will help to catalyze or increase the activity of the corrosion inhibitor and to also add passivation to pre-existing pits, crevices, or imperfections in the metal in contact with the gas-treating solution.

2. General Background of the Invention

Contaminants in crude hydrocarbons subjected to refining or purification operations include acids or acid-forming materials such as $CO_2$, $H_2S$, mercaptans, and sulfides. These acid-forming materials must be removed from the natural and cracked hydrocarbon or refined streams (which contain such hydrocarbons as methane, ethane, propane, etc. and olefins such as ethylene, propylene, butylene, etc). One typically used method of removing the acids and acid-forming materials from hydrocarbon gases or liquids is by absorption in an amine regenerative solution absorbent unit. Regenerative amine solution units include columns with trays or other packing which are used to contact the aqueous alkanolamine solution with the hydrocarbon gases or liquids which contain the acids or acid-forming compounds. The amine solution can be regenerated by thermal stripping with steam to remove the acids or acid-forming compounds such as $H_2S$, $CO_2$, mercaptans and sulfides. This is accomplished in a regeneration section of the unit comprised of a column with trays or other packing in which the amine is contacted with steam, a reboiler in which the steam is formed, a reflux condenser and return system in which the steam is conserved, and other associated heat exchange equipment used for energy conservation or subsequent cooling of the amine prior to its return to the absorption section of the unit. Due to the presence of these acids and acid-forming compounds, corrosion is often observed in the equipment containing the solutions.

The metallurgy of the equipment contacting the treating solution is usually carbon steel or stainless steel. The iron in these steels are typically hydrolyzed or oxidized to any of the following iron hydroxides or iron oxides: $Fe(OH)_2$, $Fe(OH)_3$, $FeO(OH)$, $Fe_2O_3$, or $Fe_3O_4$. $Fe_3O_4$, or magnetite, is the hardest, most impervious, and most insoluble of the iron oxides or iron hydroxides. Due to the much lower corrosion potential, it is highly desirable to maximize the conversion of iron in contact with the treating solution to the magnetite form.

BRIEF SUMMARY OF THE INVENTION

The apparatus of the present invention solves the problems confronted in the art in a simple and straightforward manner.

The present invention relates to the addition of oxygen scavengers to alkanolamine solutions, blends of different alkanolamines, mixtures of alkanolamines with physical absorbents such as sulfolane or tetraglyme, and to physical absorbents such as ethylene glycol, diethylene glycol, triethylene glycol, tetraethylene glycol, sulfolane, or dimethylethers of polyethylene glycol. The oxygen scavengers serve as corrosion inhibitors by reducing the iron oxides and hydroxides to the more corrosion resistant magnetite form. Additionally solutions of metal oxides may also be added to provide supplemental corrosion protection through additional passivation.

The oxygen scavengers can comprise quinone and an oxime, quinone and a hydroxylamine, or quinone and an oxime and a hydroxylamine. The oxygen scavengers can advantageously be mixed in deionized water. The resulting aqueous solution is preferably added to to treating solution in a concentration of 0.0001–50,000 ppm, and more preferably 100–500 ppm (aqueous solution to treating solution).

The present invention includes a method of inhibiting corrosion in gas or light hydrocarbon treating systems utilizing as a treating solution alkanolamine aqueous solutions or physical solvents or combinations thereof by adding to the treating solution a mixture of oxygen scavengers in a concentration of from 0.001 to 50,000 ppm comprised of mixtures of a quinone and oximes of the formula

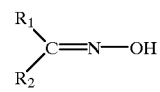

in which $R_1$ and $R_2$ are the same or different and are selected from hydrogen or lower alkyl groups of one to six carbon atoms. The oxime is preferably selected from a group consisting of methylethylketoxime, acetaldoxime, butyraldoxime, and propionaldoxime. The quinone is preferably hydroquinone. The alkanolamine is preferably selected from a group consisting of monoethanolamine, diethanolamine, methyldiethanolamine, triethanolamine, methylmonoethanolamine, 2-(2-aminoethoxy)ethanol, and diisopropanolamine. The treating solution preferably comprises mixtures of two or more amines or an amine and a physical absorbent from a group consisting of piperzine and sulfolane. The physical solvent is preferably a dimethylether of a polyethyleneglycol, tetraethyleneglycol, or sulfolane. Sodium molybdate is sometimes preferably added with the oxygen scavengers in a concentration of from 0.001 to 50,000 ppm to the treating solution.

The present invention also comprises a method of inhibiting corrosion in gas or light hydrocarbon treating systems utilizing as a treating solution alkanolamine aqueous solu tions or physical solvents or combinations thereof by adding to the treating solution a mixture of oxygen scavengers from 0.001 to 50,000 ppm comprised of mixtures of a quinone and hydroxylamines of the formula

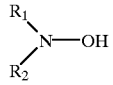

in which $R_1$ and $R_2$ are the same or different and are selected from hydrogen or lower alkyl groups of one to six carbons. The hydroxylamine is preferably selected from a group consisting of diethylhydroxylamine, isopropylhydroxylamine, dimethylhydroxylamine, hydroxylethylhydroxylamine, or hydroxylmethylhydroxylamine. The quinone is preferably hydroquinone. The alkanolamine is preferably selected from a group consisting of monoethanolamine, diethanolamine, methyldiethanolamine, triethanolamine, methylmonoethanolamine, 2-(2-aminoethoxy)ethanol, and diisopropanolamine. The treating solution preferably comprises mixtures of two or more amines or an amine and a physical absorbent from a group consisting of piperzine and sulfolane. The physical solvent is preferably a dimethylether of a polyethyleneglycol, tetraethyleneglycol, or sulfolane. Sodium molybdate is sometimes preferably added with the oxygen scavengers in a concentration of from 0.001 to 50,000 ppm to the treating solution.

The present invention also comprises a method of inhibiting corrosion in gas or light hydrocarbon treating systems utilizing as a treating solution alkanolamine aqueous solutions or physical solvents or combinations thereof by adding to the treating solution a mixture of oxygen scavengers comprising mixtures of a quinone, oxime, and hydroxylamine in a concentration of from 0.001 to 50,000 ppm. The oxime is preferably selected from a group consisting of methylethylketoxime, acetaldoxime, butyraldoxime, and propionaldoxime. The quinone is preferably hydroquinone. The hydroxylamine is preferably selected from a group consisting of diethylhydroxylamine, isopropylhydroxylamine, dimethylhydroxylamine, hydroxylethylhydroxylamine, or hydroxylmethylhydroxylamine. The alkanolamine is preferably selected from a group consisting of monoethanolamine, diethanolamine, methyldiethanolamine, triethanolamine, methylmonoethanolamine, 2-(2-aminoethoxy)ethanol, and diisopropanolamine. The treating solution preferably comprises mixtures of two or more amines or an amine and a physical absorbent from a group consisting of piperzine and sulfolane. The physical solvent is preferably a dimethylether of a polyethyleneglycol, tetraethyleneglycol, or sulfolane. The physical solvent is preferably a dimethylether of a polyethyleneglycol, tetraethyleneglycol, or sulfolane. Sodium molybdate is sometimes preferably added with the oxygen scavengers in a concentration of from 0.001 to 50,000 ppm to the treating solution.

The present invention also comprises a method of reducing suspended or soluble iron or other metals in gas or light hydrocarbon treating solutions or physical solvents or combinations thereof by adding to the treating solution or physical solvent a mixture of oxygen scavengers from 0.001 to 50,000 ppm comprised of a mixture of a quinone and an oxime of the formula

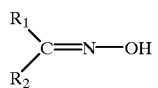

in which $R_1$ and $R_2$ are the same or different and are selected from hydrogen or lower alkyl groups of one to six carbon atoms. The oxime is preferably selected from a group consisting of methylethylketoxime, acetaldoxime, butyraldoxime, and propionaldoxime. The quinone is preferably hydroquinone. The treating solution preferably includes an alkanolamine selected from a group consisting of monoethanolamine, diethanolamine, methyldiethanolamine, triethanolamine, methylmonoethanolamine, 2-(2-aminoethoxy)ethanol, and diisopropanolamine. The treating solution preferably includes a mixture of two or more alkanolamines or an alkanolamine and a physical absorbent from a group consisting of piperzine and sulfolane. The physical solvent is preferably a dimethylether of a polyethyleneglycol, tetraethyleneglycol, or sulfolane. Sodium molybdate is sometimes preferably added with the oxygen scavengers in a concentration of from 0.001 to 50,000 ppm to the treating solution.

The present invention also includes a method of reducing suspended or soluble iron or other metals in gas or light hydrocarbon treating solutions utilizing alkanolamine aqueous solutions or physical solvents or combinations thereof by adding to the treating solution in a concentration of from 0.001 to 50,000 ppm a mixture of oxygen scavengers comprising mixtures of a quinone and hydroxylamines of the formula

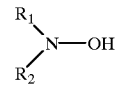

in which $R_1$ and $R_2$ are the same or different and are selected from hydrogen or lower alkyl groups of one to six carbons. The hydroxylamine is preferably selected from a group consisting of diethylhydroxylamine, isopropylhydroxylamine, dimethylhydroxylamine, hydroxylethylhydroxylamine, or hydroxylmethylhydroxylamine. The quinone is preferably hydroquinone. The alkanolamine is preferably selected from a group consisting of monoethanolamine, diethanolamine, methyldiethanolamine, triethanolamine, methylmonoethanolamine, 2-(2-aminoethoxy)ethanol, and diisopropanolamine. The alkanolamine preferably comprises a mixture of two or more alkanolamines or an alkanolamine and a physical absorbent from a group consisting of piperzine and sulfolane. The physical solvent is preferably a dimethylether of a polyethyleneglycol, tetraethyleneglycol, or sulfolane. Sodium molybdate is sometimes preferably added with the oxygen scavengers in a concentration of from 0.001 to 50,000 ppm to the treating solution.

The present invention also comprises a method of reducing suspended or soluble iron or other metals in gas or light hydrocarbon treating solutions utilizing alkanolamine aqueous solutions or physical solvents or combinations thereof by adding to the treating solution in a concentration of from 0.001 to 50,000 ppm a mixture of oxygen scavengers comprising mixtures of a quinone, oxime and hydroxylamine. The oxime is preferably selected from a group consisting of methylethylketoxime, acetaldoxime, butyraldoxime, and propionaldoxime. The quinone preferably is hydroquinone. The hydroxylamine is preferably selected from a group consisting of diethylhydroxylamine, isopropylhydroxylamine, dimethylhydroxylamine, hydroxylethylhydroxylamine, or hydroxylmethylhydroxylamine. The alkanolamine is preferably selected from a group consisting of monoethanolamine, diethanolamine, methyldiethanolamine, triethanolamine, methylmonoethanolamine, 2-(2-aminoethoxy)ethanol, and diisopropanolamine. The alkanolamine preferably comprises a mixture of two or more alkanolamines or an alkanolamine and a physical absorbent from a group consisting of piperzine and sulfolane. Sodium molybdate is sometimes preferably added with the oxygen scavengers in a concentration of from 0.001 to 50,000 ppm to the treating solution. As used herein, 'DEA' refers to diethanolamine, 'MDEA' refers to methyldiethanolamine, and MMSCFD refers to million standard cubic feet per day.

It is a principal object of the present invention to inhibit corrosion in alkanolamine or other treating solutions by adding to the solution mixture of oxygen scavengers including a quinone and oximes and/or hydroxylamines.

It is a further object of the present invention to provide the addition of the quinone, oxime, and hydroxylamine so as to reduce the iron to the magnetite form in all areas in contact with the treating solution including low temperature and higher temperature areas and in both the liquid and vapor phase.

It is a further object of the present invention to provide the addition of the quinone, oxime, and hydroxylamine so as to reduce the iron or other metals suspended or soluble in the treating solution.

It is a further object of the present invention to provide the addition of supplemental metal oxides to further affect the passivation of the treating equipment.

DETAILED DESCRIPTION OF THE INVENTION

The present invention is a method of inhibiting corrosion in gas and hydrocarbon treating solutions by adding to the solution oxygen scavengers which can comprise quinone and an oxime, quinone and a hydroxylamine, or quinone and an oxime and a hydroxylamine. The oxygen scavengers can advantageously be mixed in deionized water. When the scavengers are quinone and an oxime, they can be mixed in a ratio of 2–6 (and preferably 5) weight % quinone and 10–30 (and preferably 10) weight % oxime, with the balance deionized water. When the scavengers are quinone and a hydroxylamine, they can be mixed in a ratio of 2–6 (and preferably 5) weight % quinone and 10–30 (and preferably 10) weight % hydroxylamine, with the balance deionized water. When the scavengers are quinone, an oxime, and a hydroxylamine, they can be mixed in a ratio of 2–6 (and preferably 5) weight % quinone, 10–15 (and preferably 10) weight % oxime, and 10–15 (and preferably 10) weight % hydroxylamine, with the balance deionized water.

The invention is directed toward inhibiting corrosion in gas and hydrocarbon treating solutions by adding to the solution an oxime of the formula

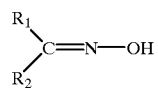

in which $R_1$, and $R_2$ are the same or different and are selected from hydrogen or lower alkyl groups of one to six carbon atoms. Also added to the treating solution is a hydroxylamine of the formula

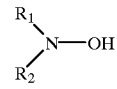

in which $R_1$ and $R_2$ are the same or different and are selected from hydrogen or lower alkyl groups of one to six carbon atoms. Also added to the treating solution is a quinone of the formula

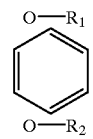

in which $R_1$ and $R_2$ are the same or different and are selected from primarily hydrogen but may also be a lower alkyl group.

The quinone acts as a promoter so that the iron reduction reactions with the oxime and hydroxylamine occur at a lower temperature than they would unpromoted. The oxime and hydroxylamine are more aggressive toward actual reduction of the iron to magnetite. The primary but not necessarily only products of said reactions other than the magnetite are $H_2O$, $N_2O$, $N_2$, $CO_2$, low molecular weight ketones, and lower volatile amines.

The oximes and hydroxylamines may be used independently of the quinone or together with the quinone. The preferred embodiments provides that the choice of oximes and hydroxylamines is such that the oxygen scavengers utilized have both vapor and liquid distribution through all operating areas of the treating equipment. The preferred hydroxylamine for use in the present invention is diethylhydroxylamine, though it is believed that isopropylhydroxylamine, dimethylhydroxylamine, hydroxylethylhydroxylamine, and/or hydroxylmethylhydroxylamine could also be used.

The hydroxylamine is advantageous as it improves preferential scavenging of oxygen in the vapor phase. In the operating units temperatures vary from less than 100 degrees F. to over 260 degrees F. and the addition of the more volatile component (hydroxylamine results in improved inhibition above the liquid phase alkanolamine solution from reactions with oxygen.

In conjunction with the oxygen scavengers, a metal oxide such as sodium molybdate may be added. The molybdate will further passivate the metal surfaces especially where an imperfection has occurred due to previous corrosive action such as pitting, cracking, or erosion. The molybdate will also help to fill and smooth out any minor imperfections or rough areas on the original metal surface.

EXAMPLE 1

Natural Gas Plant—CO2 Removal—DEA Solvent:

A corrosion inhibitor (Inhibitor A) was produced by adding 5 weight % of hydroquinone, 10 weight % of methylethylketoxime, and 10 weight % of diethylhydroxylamine to deionized water.

A plant treating about 75 MMSCFD of natural gas containing about 8% CO2 uses a 27% DEA solution to reduce the treated gas content to less than 3% CO2. Until recently, the CO2 lean loadings were very high, often exceeding 0.1 mol CO2/mol of DEA. The following were some of the consequences of corrosion prior to the start of the Inhibitor A plant trial:

A total iron concentration in the solvent was increasing steadily;

A plate-and-frame lean/rich exchanger required frequent cleaning to remove iron carbonate deposits; and Several pinhole leaks developed on the hot lean amine piping to and from the reboiler since startup about two year ago.

The solvent was becoming increasingly blue as a result of corrosion of stainless steel equipment.

Solution:

Coastal Chemical recommended to treat the system with Inhibitor A. Inhibitor A is an effective corrosion inhibitor and antifoulant treatment program for amine units.

Inhibitor A was added at a rate of 8 gallons per day for three weeks to a 12,000 gallon 27 weight % alkanaolamine system. The addition rate was then reduced to 2 gallons per day for the next six months and then further reduced to 1 gallon per day as the final daily addition rate.

Results:

Corrosion in the system was markedly reduced as indicated by solution iron decreasing from an initial concentration of 65 ppm to less than 30 ppm within two weeks of initial dosing. System fouling due to corrosion products and leakage were also diminished within the first couple of months of usage.

The solvent iron concentration has decreased steadily from 65 PPM to a 10 to 20 PPM range despite high lean loadings.

The differential pressure across the plate-and-frame exchanger has remained steady at about 5 PSIG for several months showing no signs of fouling.

No leaks on the hot lean amine piping have occurred since startup of treatment with Inhibitor A.

EXAMPLE 2

Refinery Hydrogen Unit—CO2 Removal—MDEA-Based Specialty Solvent:

An amine unit treats gas containing about 25% CO2 with a 50% solution of a specialty MDEA-based solvent to remove acidic compounds from the incoming sour gas.

Total iron concentration in the solvent ranged from 100 PPM to over 500 PPM.

Iron carbonate fouling reduced heat transfer effectiveness and caused equipment plugging.

Corrosion rates historically ranged from 50 to over 100 mils/year as measured by electrical-resistance corrosion probes.

Several pieces of equipment developed leaks and other types of failures due to corrosion caused by carbonic acid attack.

Solution:

Coastal Chemical recommended to treat the system with Inhibitor A. Inhibitor A is an effective corrosion inhibitor and antifoulant treatment program for amine units.

Inhibitor A was added at a rate of about 15 gallons per day for three weeks to an about 35,000 gallon 50 weight % MDEA-based specialty system. The addition rate was then reduced to about 10 gallons per day for the next six months and then further reduced to about 6 gallons per day as the final daily addition rate.

Results:

The solvent iron concentration has decreased steadily to the lowest levels in record since continuous injection of Inhibitor A was started.

The corrosion rates as measured by corrosion probes decreased to the 0 to 5 mils/yr range.

The sodium molybdate mentioned previously can be purchased commercially in a 30% aqueous solution, and it might be added to Inhibitor A, for example, by substituting the 30% aqueous solution for 10% of the deionized water.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed as invention is:

1. A method of inhibiting corrosion in gas or light hydrocarbon treating systems utilizing as a treating solution alkanolamine aqueous solutions or physical solvents or combinations thereof by adding to the treating solution a mixture of oxygen scavengers in a concentration of from 0.001 to 50,000 ppm comprised of mixtures of a quinone and oximes of the formula

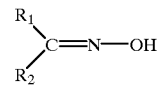

in which $R_1$ and $R_2$ are the same or different and are selected from hydrogen or lower alkyl groups of one to six carbon atoms, wherein the physical solvent is a dimethylether of a polyethyleneglycol, tetraethyleneglycol, or sulfolane.

2. A method of inhibiting corrosion in gas or light hydrocarbon treating systems utilizing as a treating solution alkanolamine aqueous solutions or physical solvents or combinations thereof by adding to the treating solution a mixture of oxygen scavengers from 0.001 to 50,000 ppm comprised of mixtures of a quinone and hydroxylamines of the formula

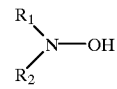

in which $R_1$ and $R_2$ are the same or different and are selected from hydrogen or lower alkyl groups of one to six carbons, and in which the treating solution comprises mixtures of two or more amines or an amine and a physical absorbent from a group consisting of piperzine and sulfolane.

3. A method of inhibiting corrosion in gas or light hydrocarbon treating systems utilizing as a treating solution alkanolamine aqueous solutions or physical solvents or combinations thereof by adding to the treating solution a mixture of oxygen scavengers from 0.001 to 50,000 ppm comprised of mixtures of a quinone and hydroxylamines of the formula

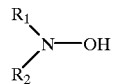

in which $R_1$ and $R_2$ are the same or different and are selected from hydrogen or lower alkyl groups of one to six carbons, wherein the physical solvent is a dimethylether of a polyethyleneglycol, tetraethyleneglycol, or sulfolane.

4. A method of inhibiting corrosion in gas or light hydrocarbon treating systems utilizing as a treating solution alkanolamine aqueous solutions or physical solvents or combinations thereof by adding to the treating solution a mixture of oxygen scavengers comprising mixtures of a quinone, oxime and hydroxylamine in a concentration of from 0.001 to 50,000 ppm, and in which the treating solution comprises mixtures of two or more amines or an amine and a physical absorbent from a group consisting of piperzine and sulfolane.

5. A method of inhibiting corrosion in gas or light hydrocarbon treating systems utilizing as a treating solution alkanolamine aqueous solutions or physical solvents or combinations thereof by adding to the treating solution a mixture of oxygen scavengers comprising mixtures of a quinone, oxime, and hydroxylamine in a concentration of from 0.001 to 50,000 ppm, wherein the physical solvent is a dimethylether of a polyethyleneglycol, tetraethyleneglycol, or sulfolane.

6. A method of reducing suspended or soluble iron or other metals in gas or light hydrocarbon treating solutions or physical solvents or combinations thereof by adding to the treating solution or physical solvent a mixture of oxygen scavengers from 0.001 to 50,000 ppm comprised of a mixture of a quinone and an oxime of the formula

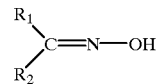

in which $R_1$ and $R_2$ are the same or different and are selected from hydrogen or lower alkyl groups of one to six carbon atoms, wherein the physical solvent is a dimethylether of a polyethyleneglycol, tetraethyleneglycol, or sulfolane.

7. A method of reducing suspended or soluble iron or other metals in gas or light hydrocarbon treating solutions utilizing alkanolamine aqueous solutions or physical solvents or combinations thereof by adding to the treating solution in a concentration of from 0.001 to 50,000 ppm a mixture of oxygen scavengers comprising mixtures of a quinone and hydroxylamines of the formula

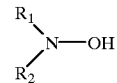

in which $R_1$ and $R_2$ are the same or different and are selected from hydrogen or lower alkyl groups of one to six carbons, wherein the physical solvent is a dimethylether of a polyethyleneglycol, tetraethyleneglycol, or sulfolane.

8. A method of inhibiting corrosion in gas or light hydrocarbon treating systems utilizing as a treating solution alkanolamine aqueous solutions or physical solvents or combinations thereof by adding to the treating solution a mixture of oxygen scavengers comprising mixtures of a quinone, oxime, and hydroxylamine in a concentration of from 0.001 to 50,000 ppm, wherein the physical solvent is a dimethylether of a polyethyleneglycol, tetraethyleneglycol, or sulfolane.

* * * * *